United States Patent [19]

Grinwald

[11] Patent Number: 4,570,959
[45] Date of Patent: Feb. 18, 1986

[54] DOLLY UNIT

[75] Inventor: Israel M. Grinwald, Oakland, Mich.

[73] Assignee: The United States of America as represented by the Secretary of the Army, Washington, D.C.

[21] Appl. No.: 650,013

[22] Filed: Sep. 13, 1984

[51] Int. Cl.⁴ .................................................. B60P 3/40
[52] U.S. Cl. ................................... 280/43.23; 414/458
[58] Field of Search ...................... 414/458; 280/43.23, 280/43.17, 43, 477

[56] References Cited

U.S. PATENT DOCUMENTS 3,243,193 3/1966 Fulmer et al. .................. 414/458 X
3,378,276 4/1968 Fulmer ............................. 280/43.23
3,521,898 7/1970 Fulmer et al. .................... 280/43.23
3,536,220 10/1970 Coker .................................... 414/458
4,143,885 3/1979 Mahosky ............................. 280/477
4,416,466 11/1983 Park ..................................... 280/477

Primary Examiner—Joseph F. Peters, Jr.
Assistant Examiner—Michael Mar
Attorney, Agent, or Firm—Peter A. Taucher; Gail S. Soderling; Robert P. Gibson

[57] ABSTRACT

An improved dolly for transporting a shelter. The dolly has bifurcated supporting elements which engage alignment studs on the shelter to accurately and quickly align attachment brackets on the dolly with complimentary attachments on the shelter.

2 Claims, 5 Drawing Figures

DOLLY UNIT

GOVERNMENT INTEREST

The invention described herein may be manufactured, used, and licensed by or for the Government for governmental purposes without payment to me of any royalty.

BACKGROUND

In one aspect, this invention relates to moveable shelters. In another aspect, this invention relates to detachable dolly units which can be used to move large structures.

It has become common to construct shelters for medical or electronic equipment as rigid structures which sit on a base structure but can be moved from place to place. To move one of the structures, two dolly units are moved into position with one at the front and one at the rear of the shelter. Each dolly must be positioned and tilted so a lifting prong engages a portion of the shelter near its lower edge. Fasteners are then used to attach the dolly to the end of the shelter and the dollys righted to lift the shelter. One of the dollys has a tow bar which can be attached to a towing vehicle and the shelter, with a dolly attached front and rear, can be moved to a new location. The dollys are removed and the shelter is firmly positioned on the ground.

The shelters commonly in use for medical and electrical applications have increased in size and weight to accommodate new and improved technology. Consequently, dollys suitable for lifting the shelters off the ground and supporting them for transport have also had to increase in size and weight. The increased weight makes the dollys more difficult to maneuver into position. Positioning of the dolly is particularly important since the fasteners must be accurately aligned with complimentary fastening means on the shelter to hold the unit together during transportation. Because of the dolly's weight, it requires two or more people to position the dolly and misalignments are frequent. Generally, it has been found that 20–30 minutes are required to align and fasten a dolly to a shelter. Positioning is a particular problem since if the fasteners do not mate, the dolly must be backed out of engagement with the shelter and repositioned for another alignment attempt. Such attempts consume valuable time and are fatiguing to the individuals who are positioning the dolly.

It would be desirable to have a dolly which can easily be positioned at the end of a shelter to facilitate the alignment and attachment of the dolly to the shelter. This would decrease the time necessary to position the dolly and for attachment to the shelter.

BRIEF DESCRIPTION OF THE INVENTION

Generally, an attachment system according to this invention has edge brackets attached to the edge of a shelter at a position somewhat above grade level; with each of the edge brackets having an aligning stud extending downward from the shelter. A wheeled dolly is constructed with a plurality of bifurcated supporting elements adapted to engage the aligning studs. When the studs are at the root of the bifurcation, apertures in the supporting element will be aligned with holes in the edge brackets to allow fasteners to be inserted for firmly binding the edge brackets and the supporting elements. The supporting elements are mounted on a supporting frame which is in turn mounted on an axle with tires.

When a dolly is attached to each end of the shelter, the shelter can be moved to a new location. Because of the aligning portions of the attachment system, the time necessary to install the dollys is reduced and only a single positioning would be necessary.

DETAILED DESCRIPTION OF PREFERRED EMBODIMENTS

Figure 1:
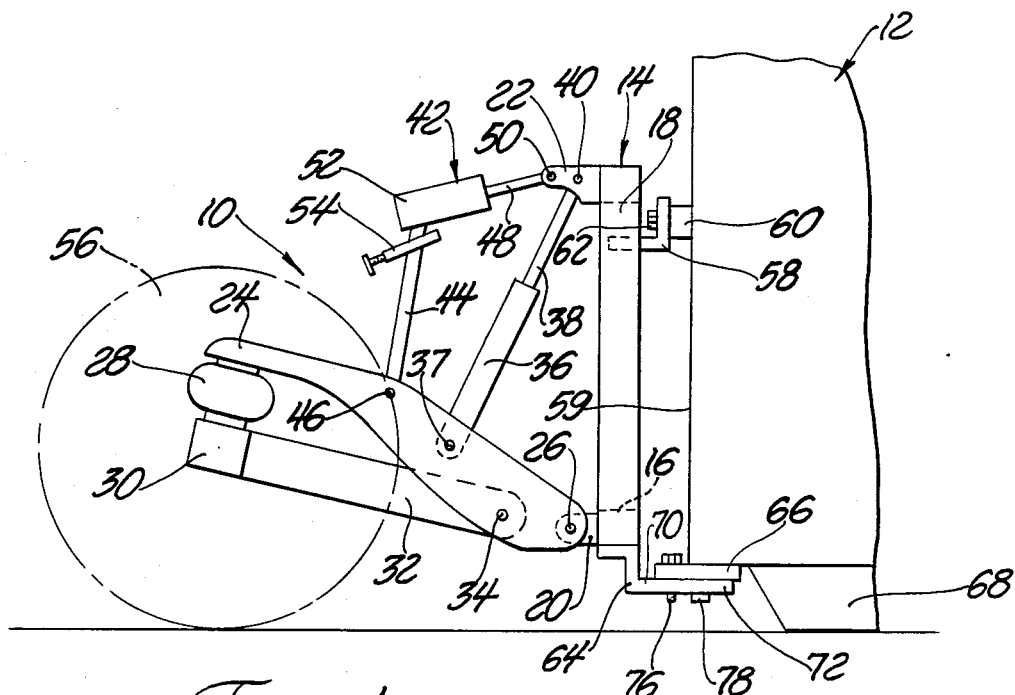
FIG. 1 is a side view of the dolly and attachment mechanism in position to raise a shelter.
Figure 2:
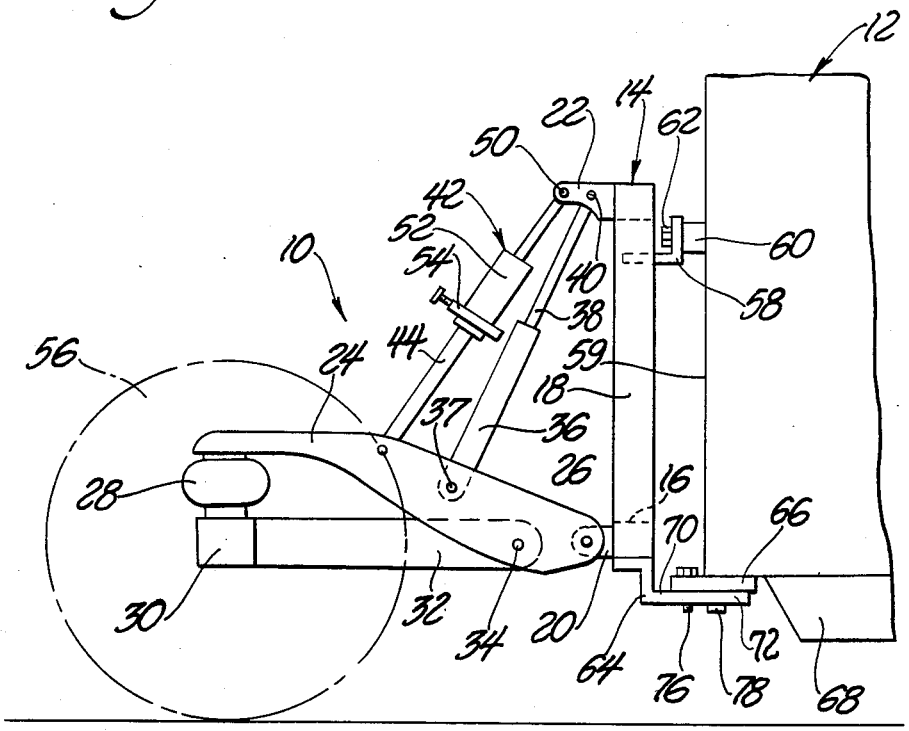
FIG. 2 shows the shelter in the raised position.

Reference is made to the accompanying drawing and initially to FIGS. 1 and 2. A dolly 10 is shown which can be used to lift and in combination with a second dolly (not shown) to move a shelter 12 to another location. In general, the shelter 12 to be moved will be about 8 feet high, 8 feet wide and up to about 20 feet long. The shelter will generally weight about 2 to 6 tons with all of its associated equipment and storage capacity. The two individual dolly units when attached to the shelter collectively carry the shelter weight while a truck or other towing vehicle moves the shelter to a new location.

The dolly 10 includes a shelter support frame 14 formed by a horizontal tube 16 and a pair of vertical upright members 18 laterally spaced apart and attached to the horizontal tube at the uprights lower ends. The support frame 14 can have such additional bracing or support members as are desirable to maintain the horizontal tube 14 and vertical members 18 in the desired spatial relationship.

The support frame has a lower attachment pintle 20 extending outward from the horizontal tube 16 located at the upper portion of the frame and extending outward from the support frame to allow attachment of the support frame to an axle structure to be discussed.

The attachment pintle 20 has a shaped arm 24 journaled to the attachment pintle by means of a pin 26. The other end of the shaped arm 24 is mounted to a flexible shock absorber 28 which is in turn mounted on an axle 30.

A tie rod or yoke 32 has one end attached to the axle 30 and the other end is rotatably attached to the shaped arm 24 at pin 34. The tie rod 32 is attached to the shaped arm 24 at a point between the axle 30 and the attachment pintle 20 so that when the axle is rotated about its longitudinal axis, the end of the yoke 32 and the shaped arm 24, which are attached to the axle, will stay in their spacial arrangement.

A hydraulic cylinder 36 has one end pinned to the shaped arm 24 by pin 37. A shaft 38 is connected to and controlled by the hydraulic cylinder 36 so that the shaft can be extended or retracted. The end of the shaft 38 opposite the hydraulic cylinder 36 is fastened to the attachment bracket 22 by means of a pin 40. The shaft 38 can be extended outward or retracted inward by the cylinder 36 using a hydraulic pump, valves and normal hydraulic control apparatus (not shown). Such control mechanisms are known in the art and are omitted in the interest of brevity. A hydraulic hand pump and manual control valves for controlling the hydraulic fluid have been found adequate for dollys of this design.

An articulated strut 42 has a first arm 44 rotatably pinned to the shaped arm 24 by a pin 46 and a second arm 48 fastened to attachment bracket 22 by a pin 50. The arm 42 articulates about an articulating joint (not shown) covered by shield 52 which is mounted rigidly and coaxially with the second arm 48. A clamp means 54 is rotatably mounted to the first arm 44 near the articulating joint. When the clamp is loosened and rotated towards the first arm 44 as shown in FIG. 1, the arm can bend as shown to decrease the distance between the shaped arm 24 and the attachment bracket 22. When the strut 42 is straightened, as shown in FIG. 2, the clamp 54 can be rotated to a position perpendicular to the strut and tightened against the shield 52 to lock the strut 42 into a rigid position holding the support frame 14 in a fixed relationship to the shaped arm 24.

The axle 30 has tires 56 mounted on each end as shown in phantom in FIGS. 1 and 2. A tow bar 57, FIG. 5, extends from the dolly 10 for attachment of a tractor or other power source.

The upper portion of the support frame 14 has an L-shaped bracket 58 attached so that one leg of the bracket is positioned adjacent to and parallel to an end 59 of the shelter 12. An attaching boss 60 is attached to the shelter end 59 and is adapted to receive fasteners 62 which bind the support frame 14 and shelter 12 firmly together.

Figure 3:
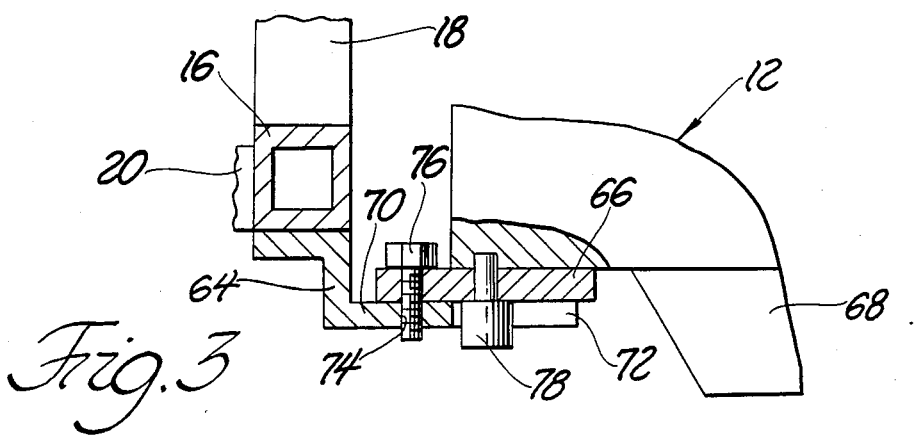
FIG. 3 shows an enlarged side view of the attachment structure of FIG. 1.
Figure 4:
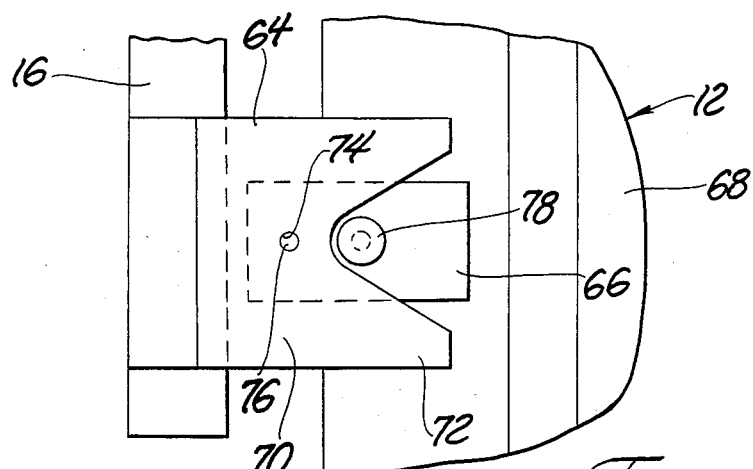
FIG. 4 shows an enlarged top view of the attachment of FIG. 1.

The lifting and aligning portion of the dolly is shown in greater detail in FIGS. 3 and 4. The lower portion of the dolly 10 has supporting elements 64, generally at least two in number, adapted for engagement with and attachment to an edge plate 66 which is in turn rigidly mounted to the bottom of the shelter 12. The bracket 16 is exposed since the shelter 12 is mounted on skids 68 or the like which keep the edge of the shelter from resting on the ground.

The support element 64 has a horizontally extending plate 70 which projects outward from the dolly to form a supporting surface and has a bifurcated portion 72 forming a V-shaped receiving surface on the outermost area of the supporting element. The support element 64 has an aperture 74, adapted to receive a fastening means 76 when the fastener is passed through a complimentary aperture in the edge plate 66. The fastener will bind the edge plate and support element and allow a towing means to pull the shelter.

An aligning stud 78 projects downward from the edge plate 66 to provide means for aligning the apertures in the edge bracket and support element 64. When the aligning stud 78 is firmly seated on the root of the V-shaped opening, the apertures are at a common radius from the aligning stud and rotation will bring them into conjunction.

OPERATION

Figure 5:
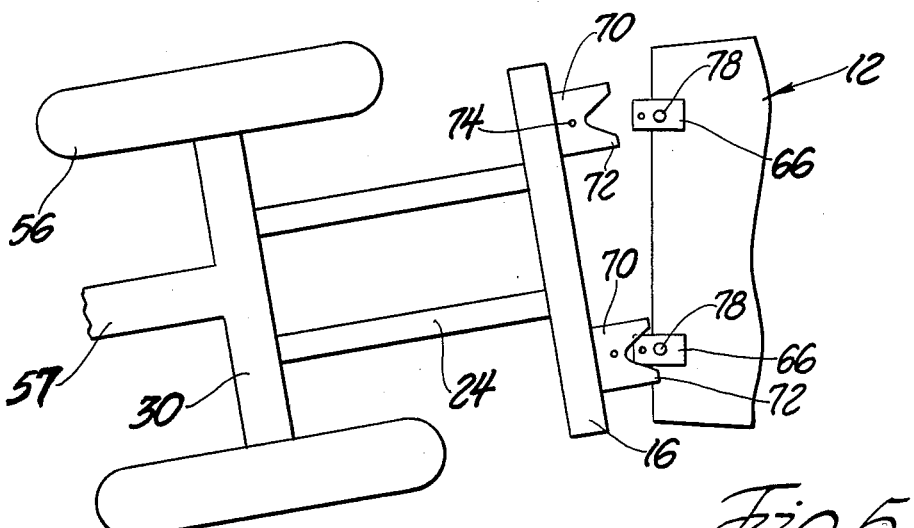
FIG. 5 is a schematic top view showing the dolly of FIG. 1 being moved into position to raise the shelter.

Referring to FIGS. 1 and 5, when it is desired to move the shelter, using a dolly 10 according to this invention, the dolly is moved to a position juxtaposed the end 59 of the shelter 12 to be moved and the dolly is tilted so that the tie rod 32 slants downward. Simultaneously, the shaft 38 is drawn into hydraulic cylinder 36 and the articulating arm 42 bent lowering the support elements 64 into a position below the edge plate 66.

One of the bifurcated portions of the supporting elements 64 is moved into a position adjacent its complimentary alignment stud disposed within the V-shaped opening and the dolly moved forward. As the alignment stud contacts the sides of the V-shaped opening, a camming action occurs, forcing the aligning stud into the root of the V-shaped opening.

Once the alignment stud is firmly set, the remainder of the dolly can be rotated using the alignment stud as a center of rotation until the remaining supporting alignment brackets have been brought into contact with their complimentary studs.

In this position, fastening means 76 are used to bind the supporting elements 64 to the edge plate 66 and also fasteners 62 to bind the L-shaped attachment brackets 50 to their complimentary bosses 60.

Then the hydraulic cylinder 36 is activated lifting the shelter 12 off the ground and simultaneously straightening the articulated arm 42. Once the articulated arm 42 is straightened, the clamp 54 can be rotated clock-wise as shown in FIG. 2 to a position where it surrounds the shield 52 and tie rod 48. Once tightened, the clamp 54 will hold the articulated arm straight and the hydraulic pressure in hydraulic cylinder 36 can be released.

The tie rod and axle are then rotated to a horizontal position and the shelter is ready for movement by the chosen source of power.

I wish it to be understood that I do not desire to be limited to the exact details of construction shown and described for obvious modifications will occur to a person skilled in the art, without departing from the spirit and scope of the appended claims.

What is claimed is:

1. An attachable system for moving rigid shelters and the like comprising: a plurality of edge brackets fixed to an edge of the shelter, each of said edge brackets including a plate rigidly attached to the shelter with an extension portion extending outward from the shelter, the extensions having an aperture and an aligning stud extending vertically from the plate; a complimentary plurality of supporting elements each having a bifurcated portion adapted to engage a corresponding aligning stud and a fastener aperture located in said elements so that when said aligning stud is positioned at the root of said bifurcated portion and the supporting elements and edge brackets are axially aligned, the apertures and fastener apertures are aligned; a plurality of fastening members disposed within the apertures and fastening apertures to firmly bind the edge brackets and supporting elements together; a support frame having a lower supporting bar with its longitudinal axis disposed horizontally and parallel to the side of the shelter to which the edge brackets are attached and at least one attachment pintle extending outward from the supporting bar on the side away from a plurality of vertical standards having their lower ends attached to the supporting bar and their upper ends located at a position above the midpoint of the shelter, an L-shaped bracket attached to the upper end of said vertical standards with one leg disposed parallel to the side of shelter said leg having an attaching aperture, and an attachment bracket attached to the uppermost end of said standards and extending outward from said standards away from said shelter; an attaching boss extending outward from said shelter to a point juxtaposed the leg; a plurality of attaching fasteners disposed in said leg and said boss to consolidate the leg and boss; a plurality of attaching fasteners disposed in said leg and said boss to consolidate the leg and boss;

a shaped arm having an attachment end journaled to the attachment pintle and having an axle end disposed at a distance from said attachment end and located so it is vertically disposed above the attachment end; an axle adapted to be attached to a source of power; a flexible attachment means connecting the axle end of said shaped arm at a relatively constant distance from the surface of the axle; a tie rod having one end rigidly affixed to the axle and the other end journaled to the shaped arm at a point between the attachment location of the shaped arm to the attachment boss and the attachment location of the flexible attachment means, said tie bar being positioned so that it is in an essentially horizontal position when the shelter is in a position for transportation; an articulated arm which can be folded when the support frame is lowered to an engaging position where the supporting elements are below the edge brackets and straightened for securing the support frame in a supporting position for lifting said shelter the articulated arm having one end attached to the midportion of the shaped arm and the other end fastened to the attachment bracket; and clamping means adapted to hold the articulating joint of the articulated arm when the shelter is in the transportation position and to allow movement of the joint when the shelter is to be loaded or unloaded.

2. The system of claim 1 further comprising a hydraulic cylinder attached at one end to the shaped arm and at the other end to the attachment bracket and a hydraulic pump fluidly connected to the hydraulic cylinder which can be used to move the articulated arm from the engaging position to the supporting position for lifting said shelter.

* * * * *